US009667743B2

(12) United States Patent
Volkmann et al.

(10) Patent No.: US 9,667,743 B2
(45) Date of Patent: May 30, 2017

(54) COMMUNICATION BETWEEN TWO CLIENTS VIA A SERVER

(75) Inventors: Frank Volkmann, Nuremberg (DE); Markus Erlmann, Mainleus (DE); Christian Hock, Fuerth (DE)

(73) Assignee: Siemens Aktiengesellschaft, Munich (DE)

( * ) Notice: Subject to any disclaimer, the term of this patent is extended or adjusted under 35 U.S.C. 154(b) by 140 days.

(21) Appl. No.: 14/404,146

(22) PCT Filed: May 31, 2012

(86) PCT No.: PCT/EP2012/060257
§ 371 (c)(1), (2), (4) Date: Nov. 26, 2014

(87) PCT Pub. No.: WO2013/178269
PCT Pub. Date: Dec. 5, 2013

(65) Prior Publication Data

US 2015/0142873 A1 May 21, 2015

(51) Int. Cl.
*G06F 15/16* (2006.01)
*H04L 29/08* (2006.01)
(Continued)

(52) U.S. Cl.
CPC .............. *H04L 67/32* (2013.01); *G06F 9/544* (2013.01); *H04L 67/1097* (2013.01); *H04L 67/2861* (2013.01); *H04L 67/42* (2013.01)

(58) Field of Classification Search
CPC . H04L 67/32; H04L 67/1097; H04L 67/2861; H04L 67/42; G06F 9/544
(Continued)

(56) References Cited

U.S. PATENT DOCUMENTS 5,732,404 A * 3/1998 Johnson .............. G06F 12/0292 711/2
6,298,454 B1 * 10/2001 Schleiss ............... G05B 23/027 714/37

(Continued)

FOREIGN PATENT DOCUMENTS

| CN | 1599912 | 3/2005 |
|---|---|---|
| CN | 101903837 | 12/2010 |
| GB | 2479037 | 9/2011 |

OTHER PUBLICATIONS

Microport; OPC Storage (OPC-EC-BCL-S); pp. 1-3;; 2010; Jul. 28, 2010.

(Continued)

*Primary Examiner* — Melvin H Pollack
(74) *Attorney, Agent, or Firm* — Cozen O'Connor

(57) ABSTRACT

A method for communication between two clients via a server in a network using OPC Unified Architecture (OPC-UA), wherein a virtual server object that provides a server functionality to a first of two clients is implemented in the server by making available to the first client a virtual address space in an address space of the server, and a process for generating and modifying virtual server nodes in said virtual address space. The server allows the second client to access virtual server nodes in the virtual address space and informs the first client each time that the second client accesses a virtual server node in the virtual address space.

15 Claims, 3 Drawing Sheets

(51) Int. Cl.
*G06F 9/54* (2006.01)
*H04L 29/06* (2006.01)

(58) Field of Classification Search
USPC .......................................................... 709/203
See application file for complete search history.

(56) References Cited

U.S. PATENT DOCUMENTS 6,324,177 B1 * 11/2001 Howes ................. H01R 31/005 370/389
6,529,937 B1 * 3/2003 Murphy, Jr. ............ H04L 29/06 709/203
7,086,009 B2 * 8/2006 Resnick .................... G06F 8/24 700/96
7,149,873 B2 * 12/2006 Mohideen ............. G06F 12/109 711/212
7,237,061 B1 * 6/2007 Boic ..................... G06F 12/084 711/113
7,328,372 B2 * 2/2008 Kataoka .............. G06F 11/2038 714/13
7,395,400 B2 * 7/2008 Mohideen ............. G06F 12/109 711/170
7,451,215 B2 * 11/2008 Hawkinson ............. H04L 29/06 709/203
7,599,999 B1 * 10/2009 Armstrong ............. G06F 9/544 709/213
7,649,908 B2 * 1/2010 Schwalb ............. H04Q 3/0025 370/401
7,796,579 B2 * 9/2010 Bruss ...................... H04L 47/10 370/351
7,860,001 B2 * 12/2010 Hlibiciuc ............ H04M 7/0084 370/230
7,860,498 B2 * 12/2010 Lovell, Jr. .............. H04W 8/12 455/418
7,953,816 B2 * 5/2011 Deen ..................... G06F 9/5016 709/202
7,984,096 B2 * 7/2011 Beoughter ......... G05B 19/0426 709/203
8,095,632 B2 * 1/2012 Hessmer ............. H04L 12/2697 709/223
8,275,871 B2 * 9/2012 Ram ..................... G06F 9/5083 709/223
8,418,166 B2 * 4/2013 Armstrong ............. G06F 11/20 717/168
8,423,608 B2 * 4/2013 Mahnke ................ H04L 12/403 709/201
8,549,065 B2 * 10/2013 Mahnke .................. G06F 9/466 709/203
8,825,984 B1 * 9/2014 Srinivasan .......... G06F 12/1027 711/206
8,881,141 B2 * 11/2014 Koch .................. G06F 9/45558 718/1
8,972,692 B2 * 3/2015 Leggette ............. G06F 11/1076 711/170
9,021,125 B2 * 4/2015 Piekarski ................ H04L 49/35 707/600
2003/0149741 A1 * 8/2003 Krooss .................... H04L 67/40 709/217
2005/0033802 A1 2/2005 Pauly et al.
2005/0119017 A1 6/2005 Lovell, Jr. et al.
2008/0195576 A1 * 8/2008 Sande ............... G06F 17/30566
2008/0198998 A1 * 8/2008 Aleynikov .......... H04L 12/2697 379/221.01
2010/0306313 A1 12/2010 Mahnke
2011/0072204 A1 * 3/2011 Chang ................. G06F 12/0284 711/103
2012/0143586 A1 * 6/2012 Vetter .................. G05B 19/042 703/20
2013/0031249 A1 * 1/2013 Gunzert ............... G05B 19/042 709/224
2013/0063449 A1 * 3/2013 Leitner .............. G05B 19/4185 345/501
2014/0019706 A1 * 1/2014 Kanfi ................ G06F 17/30082 711/171
2014/0040431 A1 * 2/2014 Rao ................... G06F 17/30283 709/219
2014/0078162 A1 * 3/2014 Timsjo ................. G05B 19/042 345/581
2015/0088281 A1 * 3/2015 Downor ............. G05B 19/0425 700/80
2015/0154136 A1 * 6/2015 Markovic ........... G06F 13/4022 710/317
2015/0237110 A1 * 8/2015 Hall ...................... H04L 67/025 715/740
2016/0050295 A1 2/2016 Neitzel et al.

OTHER PUBLICATIONS

Effectively Employ OPC Communications; 2008; Jul. 24, 2008.
Vu Van Tan et al; A SOA-Based Framework for Building Moitoring and Control Software Systems; Emerging Intelligent Computing Technology ans Applications. With Aspechts of artificial Intelligence, Springer Berlin Heidelberg, pp. 1013-1027; ISBN: 978-3-542-04019-1 ; 2009; DE; Sep. 16, 2009.
OPC Foundation; OPC Unified Architecture Specification Part:1 Overview and Concepts, Release 1.01: pp. 1-20; 2009; Feb. 5, 2009.
Office Action dated Nov. 4, 2016 which issued in the corresponding Chinese Patent Application No. 2012800735933.
OPC Foundation, "OPC Unified Architecture", Specification, Part 1: Concepts, Version Release 1.00, Jul. 28, 2006, 26 pages.

* cited by examiner

COMMUNICATION BETWEEN TWO CLIENTS VIA A SERVER

REFERENCE TO RELATED APPLICATIONS

This is a U.S. national stage of application No. PCT/EP2012/060257 filed 31 May 2012.

BACKGROUND OF THE INVENTION

1. Field of the Invention

The invention relates to the communication between two clients via a server in a network using OPC-UA.

2. Description of the Related Art

OPC Unified Architecture (OPC-UA) is a communication protocol and information model for communication between different automation components (devices).

OPC-UA is subject to a strict client-server model, i.e., servers provide information that is requested from the servers by clients. In this case, the communication between a client and a server is initiated by the client, i.e., communication always begins with the client and is therefore asymmetrical. If two components (devices) are intended to communicate with one another with equal rights (symmetrically), both must nowadays be the client and the server at the same time. There are restrictions on the transport layer, where clients and servers may be situated in the network. As a result, every client also cannot be made the server in every situation. In addition, simultaneous client and server functionality of communicating devices requires a greater outlay in terms of development and resources on both devices. This outlay is often not acceptable, particularly in the field, because the devices and networks used there are often relatively inefficient.

SUMMARY OF THE INVENTION

It is therefore an object of the invention to provide hardware and a method for communication between two clients in a network using OPC-UA.

This and other objects and advantages are achieved in accordance with the invention by providing hardware and a method for communication between two clients via a server in a network using OPC-UA, where a virtual server object is implemented in the server, which virtual server object provides a first of the two clients with the functionality of a server by providing the first client with a virtual address space in an address space of the server and a method for generating and changing virtual server nodes in the virtual address space. The server makes it possible for the second client to access virtual server nodes in the virtual address space and informs the first client each time the second client accesses a virtual server node in the virtual address space.

In this application, a node and a virtual server node are always understood as meaning an OPC-UA node, in which case the term "virtual server node" relates to an OPC-UA node created in the virtual address space of the server. Accordingly, a client is always understood as meaning an OPC-UA client and a server is always understood as meaning an OPC-UA server.

The invention makes it possible to provide a client with server functionality. For this purpose, a virtual server object is implemented in a server. This makes it possible to provide clients, in particular, with server functions that cannot be used as independent servers. This is advantageously achieved without changing or extending the OPC-UA specification, with the result that the OPC-UA specification is not contravened and all OPC-UA devices can handle the implementation in accordance with the invention of the server functionality for clients.

In one preferred embodiment of the invention, variables can be generated as virtual server nodes and a value of the variable can be changed as the change in a variable using the method for generating and changing virtual server nodes.

This embodiment advantageously makes it possible for a first client to create variables, the values of which can be read by the second client, and to change the values of these variables.

In one particularly preferred embodiment of the invention, the server generates a subscription for the first client, via which subscription the server informs the first client each time the second client accesses a virtual server node in the virtual address space.

In this case, a subscription is understood as meaning an OPC-UA subscription.

The present embodiment therefore uses an OPC-UA subscription to inform the first client of accesses to virtual server nodes. As a result, a structure which is already present in OPC-UA is advantageously used to communicate such accesses, with the result that no additional structure has to be implemented and the OPC-UA specification does not need to be changed or extended for this purpose.

In this case, the subscription preferably contains a subscription entity, in response to the change in which the first client is registered and which is changed by the server when the second client accesses a virtual server node in the virtual address space. A subscription variable is particularly preferably used as the subscription entity, in response to the value change in which the first client is registered and whose value is changed by the server when the second client accesses a virtual server node in the virtual address space.

As a result, the first client is easily informed of access to a virtual server node using a change in the subscription entity, in particular a value change in the subscription variable.

The subscription is preferably generated by the virtual server object. As a result, the virtual address space and the subscription are advantageously created by the same virtual server object, with the result that no additional object for creating the subscription must be implemented.

Furthermore, the first client preferably registers with the virtual server object via a method call. As a result, the first client is registered with the virtual server object in a simple manner.

The second client may preferably also be a server. As a result, servers can also use the server functionality of the first client.

Hardware in accordance with the invention is configured to perform the method in accordance with disclosed embodiments of the invention and therefore makes it possible to achieve the above-mentioned advantages of the method.

A client in accordance with the invention is accordingly configured to register with a virtual server object of a server and to call a method of the virtual server object for generating and changing virtual server nodes in a virtual address space generated by the virtual server object in an address space of the server.

A virtual server object is implemented in a server in accordance with the invention, with which virtual server object a client can register and which provides a client registered with it with a functionality of a server by providing the client with a virtual address space in an address space of the server and a method for generating and changing virtual server nodes in the virtual address space.

In this case, the virtual server object preferably generates a subscription for a first client registering with it, via which subscription the server informs the first client each time a second client accesses a virtual server node in the virtual address space.

A network in accordance with the invention comprises at least one client in accordance with the invention and at least one server in accordance with the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which they are achieved become clearer and more clearly comprehensible in connection with the following description of exemplary embodiments which are explained in more detail in connection with the drawings, in which.

DETAILED DESCRIPTION OF THE EXEMPLARY EMBODIMENTS

Mutually corresponding parts are provided with the same reference symbols in all figures.

Figure 1:
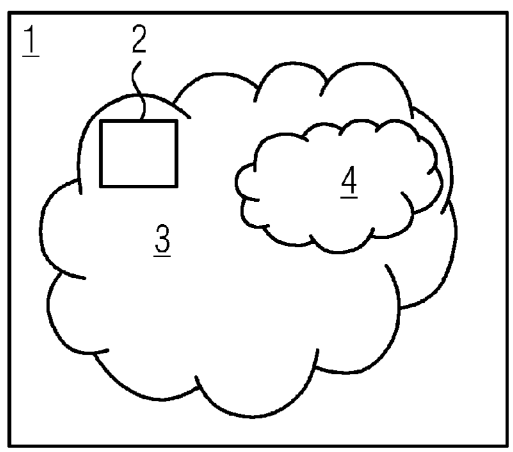
FIG. 1 shows a state of a server, in which a virtual server object is implemented, before a client registers with the virtual server object.

FIG. 1 shows a state of a server 1, in which a virtual server object 2 is implemented, before a client registers with the virtual server object 2. The virtual server object 2 and further nodes 4 of the server 1 are stored in an address space 3 of the server 1.

Figure 2:
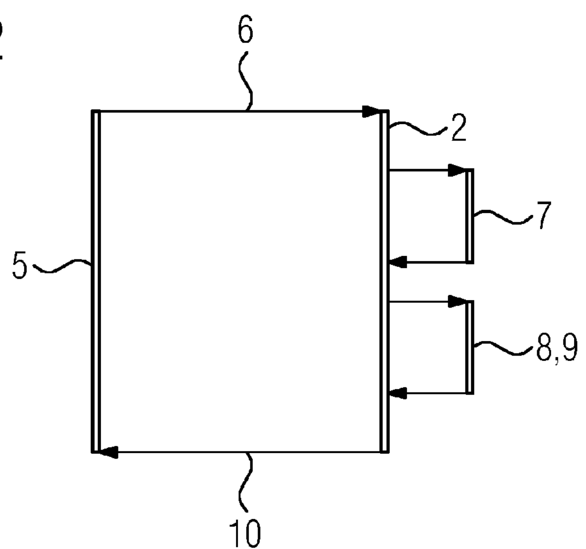
FIG. 2 shows registration of a first client with the virtual server object of the server illustrated in FIG. 1.

FIG. 2 shows registration of a first client 5 with the virtual server object 2 of the server 1 illustrated in FIG. 1. The first client 5 sends a registration message 6 to the server 1. The registration message 6 contains a call of a method of the virtual server object 2 for registering with the virtual server object 2. The virtual server object 2 then generates a virtual address space 7 for the first client 5 in the address space 3 of the server 1 and generates an OPC-UA subscription 8 having a subscription entity 9 in the form of a subscription variable. The virtual server object 2 also generates a subscription confirmation message 10 containing an item of information relating to the virtual address space 7 which has been created and a unique subscription ID, i.e., a unique identification number for the OPC-UA subscription 8.

Figure 3:
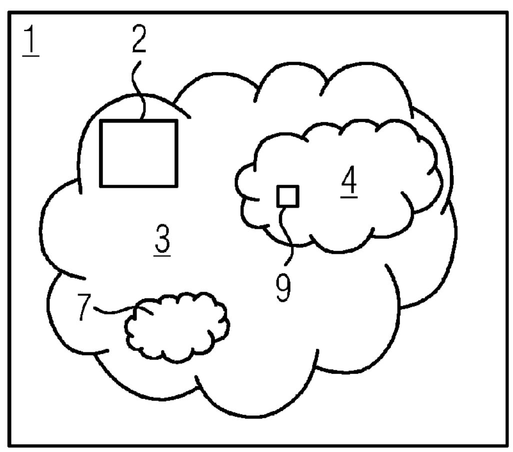
FIG. 3 shows a state of the server illustrated in FIG. 1 after a first client has registered with the virtual server object.

FIG. 3 shows a state of the server 1 illustrated in FIG. 1 after the first client 5 has registered with the virtual server object 2, as illustrated in FIG. 2. In contrast to the state illustrated in FIG. 1, the address space 3 of the server 1 now contains the virtual address space 7 generated by the virtual server object 2 and the subscription entity 9.

Figure 4:
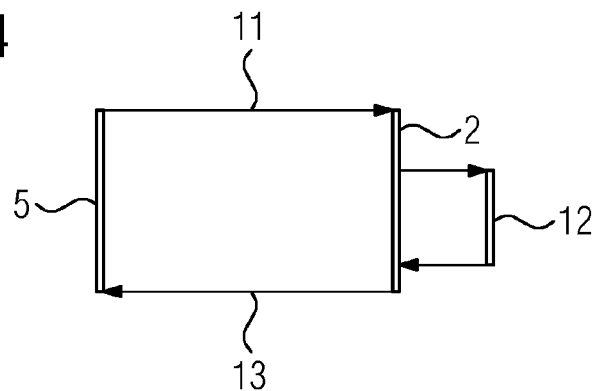
FIG. 4 shows the creation of a virtual server node by a first client using the virtual server object of the server illustrated in FIG. 1.

FIG. 4 shows the creation of a virtual server node 12 in the form of a variable by the first client 5 using the virtual server object 2 of the server 1 illustrated in FIG. 1. The first client 5 sends a generation request 11 to the server 1, which request contains a call of a method of the virtual server object 2 for generating the virtual server node 12. The virtual server object 2 then creates the virtual server node 12 in the virtual address space 7 for the first client 5 and sends a generation confirmation 13, which confirms the creation of the virtual server node 12, to the first client 5.

Figure 5:
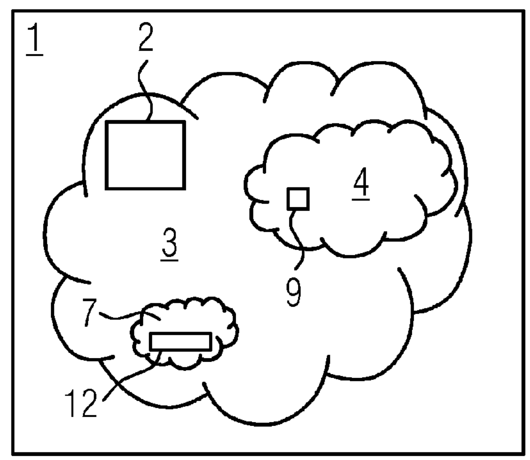
FIG. 5 shows a state of the server illustrated in FIG. 1 after a virtual server node has been created by a first client using the virtual server object.

FIG. 5 shows a state of the server 1 illustrated in FIG. 1 after the virtual server node 12 has been created by the first client 5 using the virtual server object 2, as illustrated in FIG. 4. In contrast to the state illustrated in FIG. 3, the virtual address space 7 for the first client 5 now contains the virtual server node 12.

Figure 6:
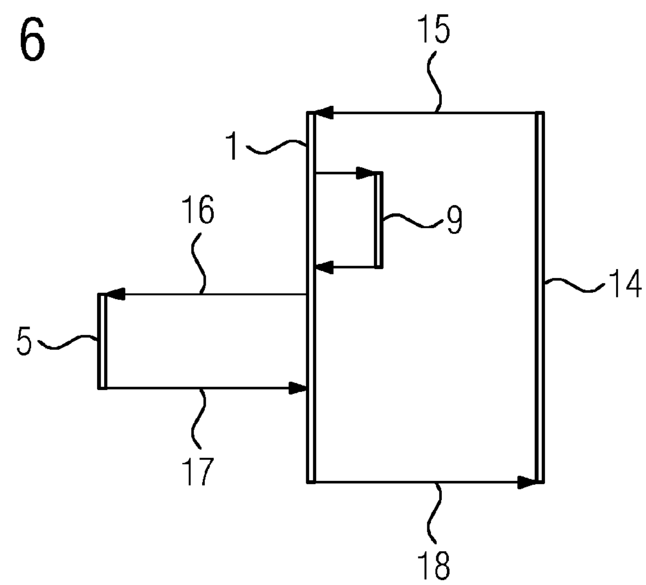
FIG. 6 shows a second client accessing a virtual server node and reactions of the server and of the first client to the access.

FIG. 6 shows a second client 14 accessing the virtual server node 12, which was created by the first client 5 using the virtual server object 2 in accordance with FIG. 4, and reactions of the server 1 and of the first client 5 to this access. The second client 14 sends a read request 15 to the server 1 to request the value of the virtual server node 12. The server 1 then changes the value of the subscription entity 9 in the form of the subscription variable. The server 1 communicates this value change to the first client 5 via a value change message 16. The first client 5 sends a write request 17 to the server 1, which write request contains a value of the virtual server node 12 and a call of a method of the virtual server object 2 for writing this value. The server object 2 then accordingly updates the value of the virtual server node 12 and the server 1 sends a value notification 18 to the second client 14, which value notification informs the second client 14 of the current value of the virtual server node 12.

Although the invention was described and illustrated in detail by means of a preferred exemplary embodiment, the invention is not restricted by the examples disclosed and other variations can be derived therefrom by a person skilled in the art without departing from the scope of protection of the invention.

Figure 7:
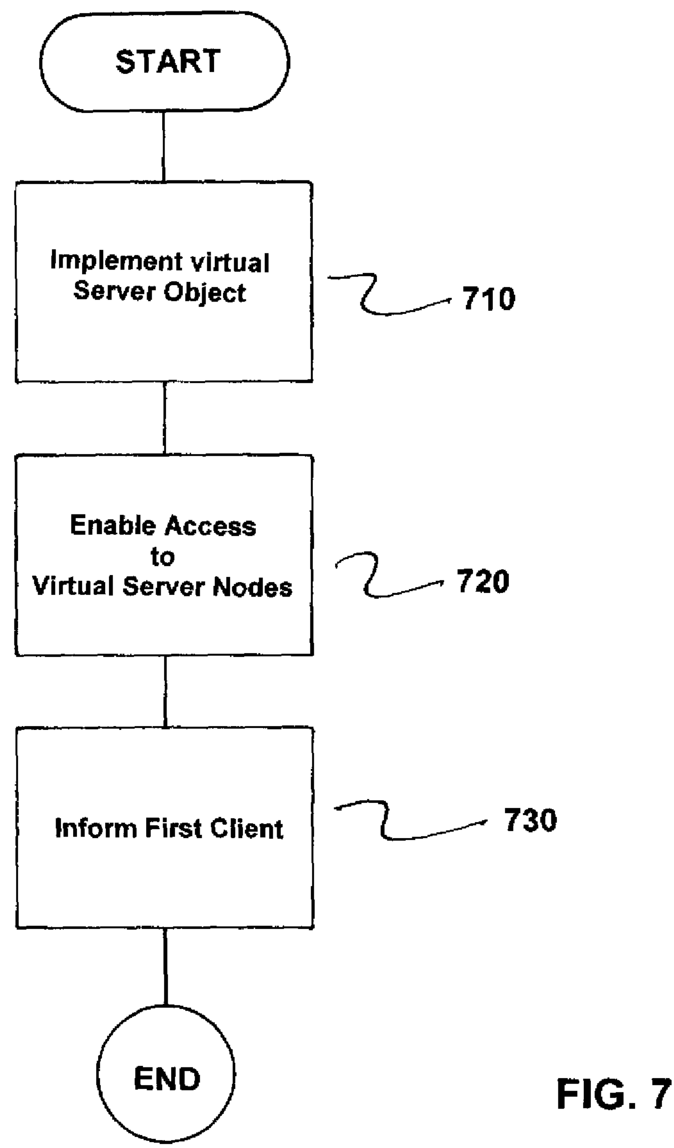
FIG. 7 is a flowchart of the method in accordance with the invention.

FIG. 7 is a flowchart of a method for communication between a plurality of clients (5, 14) via a server (1) in a network using OPC Unified Architecture (OPC-UA). The method comprises implementing a virtual server object (2) in the server (1), as indicated in step 710. In accordance with the invention, the virtual server object provides a first (5) client of the plurality of clients (5, 14) with the functionality of the server (2) by providing the first client (5) with a virtual address space (7) in an address space (3) of the server (1) and by providing a method for generating and changing virtual server nodes (12) in the provided virtual address space (7).

The server (1) then enables access by the second client (14) to access virtual server nodes (12) in the virtual address space (7), as indicated in step 720.

The server (1) now informs the first client (5) each time the second client (14) accesses a virtual server node (12) in the virtual address space (7), as indicated in step 730.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for communication between a plurality of clients via a server in a network using OPC Unified Architecture (OPC-UA), comprising:

implementing a virtual server object in the server, the virtual server object providing a first client of the plurality of clients with a functionality of the server by providing the first client with a virtual address space in an address space of the server and a method for generating and changing virtual server nodes in the provided virtual address space;

enabling, by the server, access by the second client to virtual server nodes in the virtual address space; and informing, by the server, the first client each time the second client accesses a virtual server node in the virtual address space.

2. The method as claimed in claim 1, further comprising: generating variables as virtual server nodes and changing a value of a variable as the change in the variable using the method for generating and changing virtual server nodes.

3. The method as claimed in claim 1, further comprising: generating, by the server, a subscription for the first client, via which subscription the server informs the first client each time the second client accesses a virtual server node in the virtual address space.

4. The method as claimed in claim 2, further comprising: generating, by the server, a subscription for the first client, via which subscription the server informs the first client each time the second client accesses a virtual server node in the virtual address space.

5. The method as claimed in claim 3, wherein the subscription contains a subscription entity, in response to the change in which the first client is registered and which is changed by the server when the second client accesses the virtual server node in the virtual address space.

6. The method as claimed in claim 5, wherein a subscription variable is used as the subscription entity, in response to the value change in which the first client is registered and whose value is changed by the server when the second client accesses the virtual server node in the virtual address space.

7. The method as claimed in claim 3, wherein the subscription is generated by the virtual server object.

8. The method as claimed in claim 5, wherein the subscription is generated by the virtual server object.

9. The method as claimed in claim 6, wherein the subscription is generated by the virtual server object.

10. The method as claimed in one claim 1, wherein the first client registers with the virtual server object via a method call.

11. The method as claimed in claim 1, wherein the second client is a server.

12. A client for communication between a plurality of clients via a server in a network using OPC Unified Architecture (OPC-UA), wherein the client is configured to register with a virtual server object of the server and to call a method of the virtual server object for generating and changing virtual server nodes in a virtual address space generated by the virtual server object in an address space of the server.

13. A server for communication between a plurality of clients via a server in a network using OPC Unified Architecture (OPC-UA), comprising:

a virtual server object implemented in the server, with which virtual server object a client of the plurality of clients can register and which provides the client registered with virtual server object with the functionality of the server by providing the client with a virtual address space in an address space of the server and a method for generating and changing virtual server nodes the virtual address space.

14. The server as claimed in claim 13, wherein the virtual server object generates a subscription for the first client registering with the virtual server object, via which subscription the server informs the first client each time a second client accesses a virtual server node in the virtual address space.

15. A network for providing communication between a plurality of clients via a server, the network comprising:

at least one client configured to register with a virtual server object of the server and to call a method of the virtual server object for generating and changing virtual server nodes in a virtual address space generated by the virtual server object in an address space of the server; and at least one server comprising a virtual server object implemented in the server, with which virtual server object a client of the plurality of clients can register and which provides the client registered with virtual server object with the functionality of the server by providing the client with a virtual address space in an address space of the server and a method for generating and changing virtual server nodes in the virtual address space.

* * * * *